United States Patent [19]

Tang

[11] Patent Number: 5,073,738

[45] Date of Patent: Dec. 17, 1991

[54] DIRECT CURRENT MOTOR HAVING A RETAINING DEVICE FOR HOLDING MAGNETS

[76] Inventor: Yeong Y. Tang, No. 142, Chung Shan Rd., Feng Yuan City, Taiwan

[21] Appl. No.: 634,897

[22] Filed: Dec. 27, 1990

[51] Int. Cl.⁵ .................................................. H02K 5/00
[52] U.S. Cl. .......................................... 310/91; 310/42; 310/89; 310/154
[58] Field of Search ............... 310/154, 42, 89, 91, 310/218, 258, 259, 40 MM

[56] References Cited

U.S. PATENT DOCUMENTS

| | | | |
|---|---|---|---|
| 3,083,310 | 3/1963 | Tweedy | 310/154 |
| 3,489,937 | 1/1970 | Maher | 310/154 |
| 4,445,060 | 4/1984 | Ruhle | 310/42 |
| 4,851,727 | 7/1989 | Tanaka | 310/154 |
| 4,873,461 | 10/1989 | Brennan | 310/154 |

Primary Examiner—R. Skudy
Attorney, Agent, or Firm—Townsend and Townsend

[57] ABSTRACT

A direct current motor includes a housing which is cylindrically shaped. Four magnets are received within the housing and contact the inner surface of the housing. A pair of rings are force-fitted within the end portions of the housing and are coupled together by bolts. Each of the rings has an annular flange extended inward. The magnets are retained between the annular flanges of the rings so that the magnets can be stably retained in place by the rings without any adhesive material.

1 Claim, 3 Drawing Sheets

DIRECT CURRENT MOTOR HAVING A RETAINING DEVICE FOR HOLDING MAGNETS

FIELD OF THE INVENTION

The present invention relates to a direct current motor, and more particularly to a direct current motor having a retaining device for holding magnets.

BACKGROUND OF THE INVENTION

As shown in FIG. 3, a direct current motor usually has two, four or six magnets 92 received in a housing 90. The magnets 92 are generally adhered within the housing 90 by adhesive materials. During operation, heat will be generated within the motor and the temperature within the motor will be increased so that the quality and the property of the adhesive materials will be changed and so that the magnets can not be stably retained in place which may cause the failure of the direct current motors.

The present invention has arisen to mitigate and/or obviate the afore-described disadvantages of the conventional direct current motors.

SUMMARY OF THE INVENTION

The primary objective of the present invention is to provide a direct current motor which has a retaining device for holding magnets so that the magnets can be stably retained in place.

In accordance with one aspect of the invention, there is provided a direct current motor which includes a cylindrically shaped housing. Four magnets are received within the housing and contact the inner surface of the housing. A pair of rings are force-fitted within the end portions of the housing and are coupled together by bolts. Each of the rings has an annular flange extended inward. The magnets are retained between the annular flanges of the rings so that the magnets can be stably retained in place by the rings without any adhesive material.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
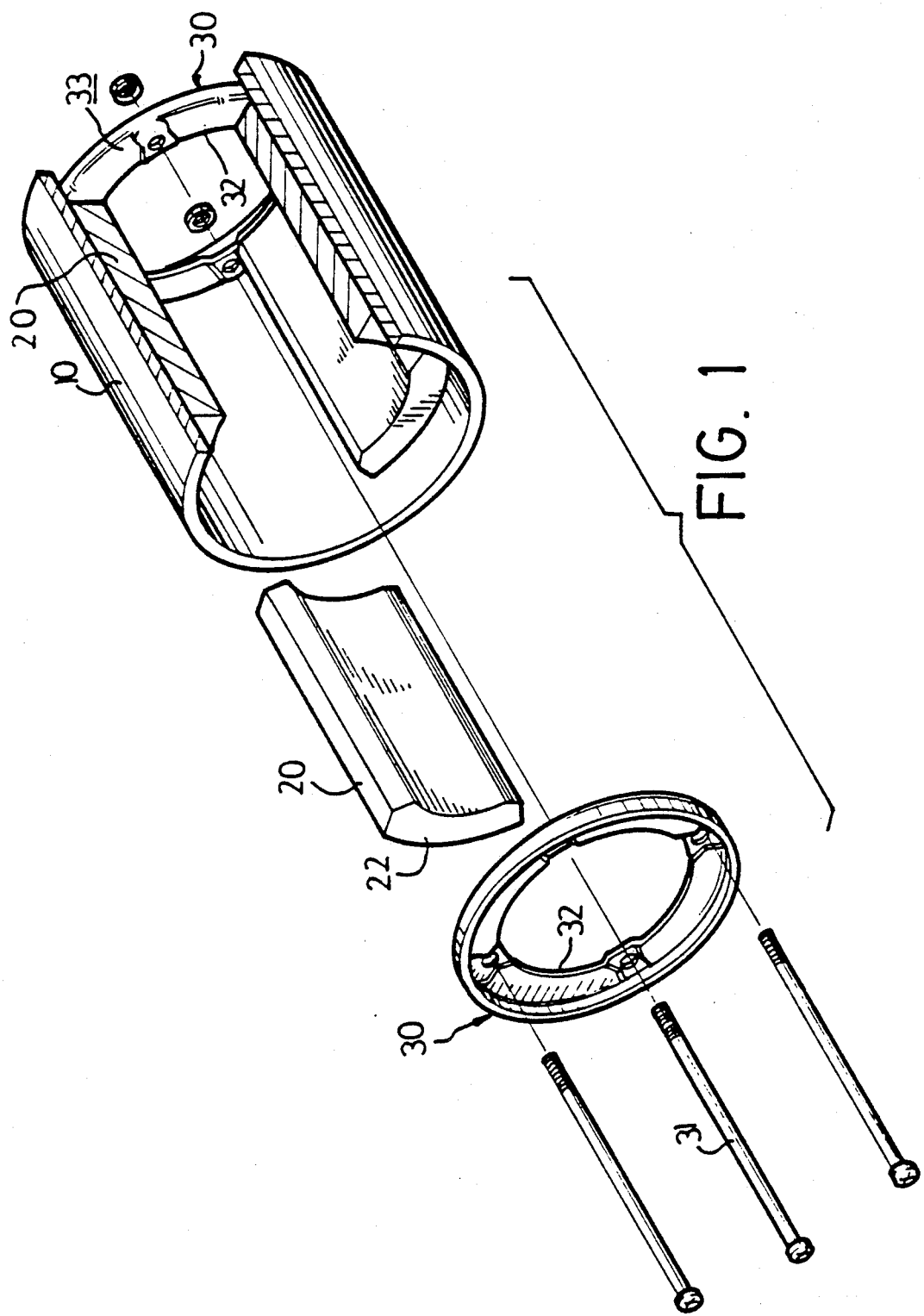
FIG. 1 is an exploded view of a direct current motor in accordance with the present invention.
Figure 2:
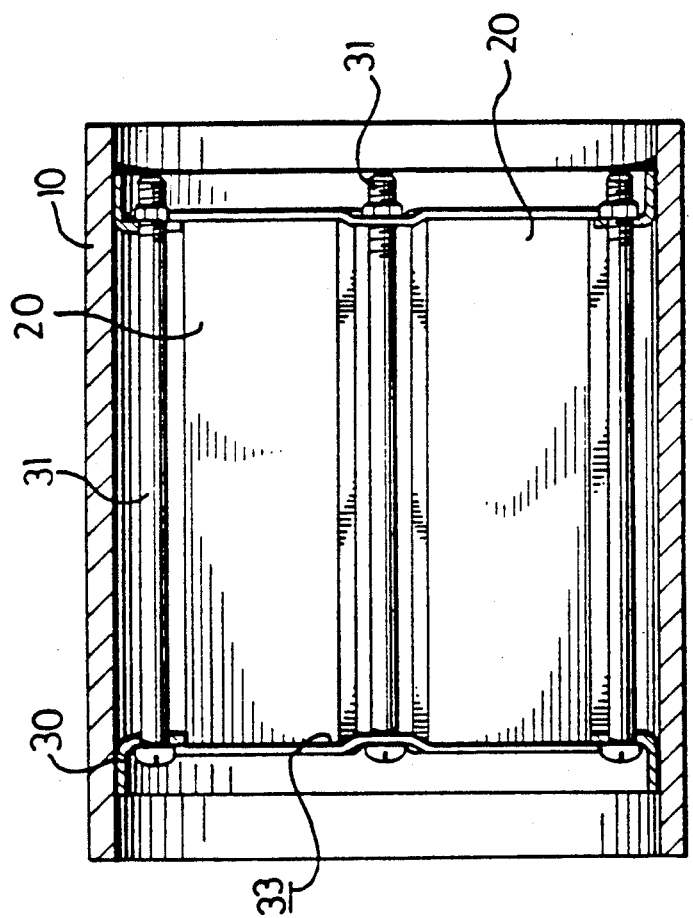
FIG. 2 is a cross sectional view of the motor.
Figure 3:
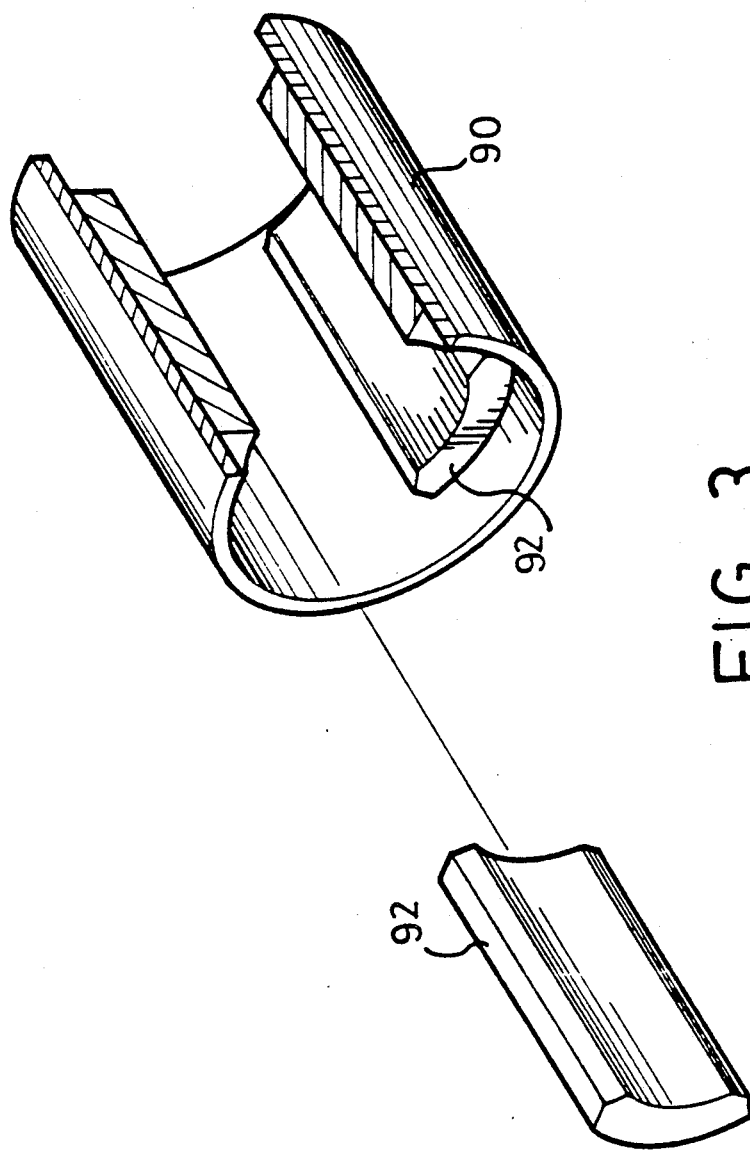
FIG. 3 is an exploded view of a conventional direct current motor.

Referring to FIGS. 1 and 2, a direct current motor in accordance with the present invention comprises generally a housing 10, four magnets 20 received within the housing 10, and a pair of rings 30 for stably holding the magnets 20 within the housing 10.

The housing 10 is substantially cylindrical shaped. The magnets 20 have a suitable curvature so that the magnets 20 closely contact the inner surface of the housing 10. The retaining device includes a pair of rings 30 each having an inwardly extended annular flange 32. The rings 30 are force-fitted in the end portions of the housing 10. The annular flanges 32 are coupled together by bolts 31 so that the magnets 20 can be stably retained between the rings 30. Four recesses 33 are formed in an inner surface of each of the annular flanges 32. The shape of each of the recesses 33 is similar to that of the end surface 22 of the magnet 20 so that the magnets 20 can further be stably retained by the rings 30.

Accordingly, the magnets 20 of the direct current motor in accordance with the present invention can be stably retained within the housing 10 by the rings 30 so that the magnets can be stably retained in place without any adhesive material.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A direct current motor comprising a housing which is cylindrically shaped, at least two magnets being received within said housing and contacting an inner surface of said housing, a pair of rings being force-fitted within end portions of said housing and being coupled together by bolts, each of said rings having an annular flange extended inward therefrom, said magnets being retained and coupled between said annular flanges of said rings, each of said annular flanges having at least two recesses formed in an inner surface thereof, each of said recesses having a shape similar to that of an end portion of each of said magnets so that said end portions of said magnets can be engaged within said recesses respectively and so that said magnets can be stably retained in place by said rings without any adhesive material.

* * * * *